Patented Oct. 4, 1932

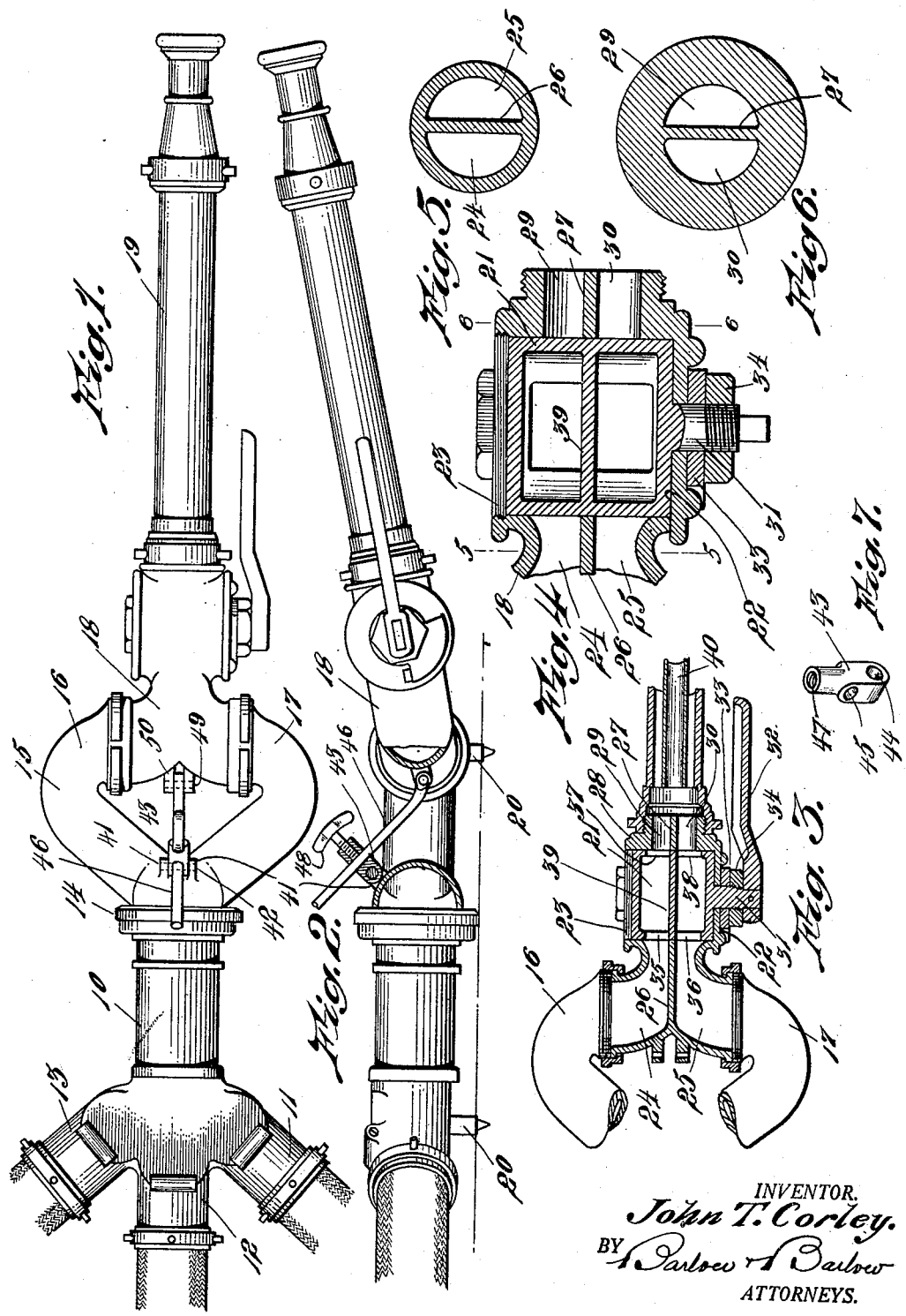

1,880,826

UNITED STATES PATENT OFFICE

JOHN T. CORLEY, OF PROVIDENCE, RHODE ISLAND, ASSIGNOR TO J. M. BAKER PATTERN COMPANY, INC., OF PROVIDENCE, RHODE ISLAND, A CORPORATION OF RHODE ISLAND

VALVE CONTROLLED STANDPIPE

Application filed May 23, 1930. Serial No. 454,843.

The present invention relates to a turret stand pipe unit of the type disclosed in my co-pending application Serial No. 344,337, filed March 5, 1929, and has particular reference to the control and the regulation of the water stream.

The water flow through portable turret stand-pipe installations has heretofore been controlled by valves situated in back of the portable stand-pipe, and not in any part of the stand pipe itself, thus preventing quick action on the part of the operator as he must go back along the hose line to shut off the supply. Applicant's improved portable unit is equipped with a quick action plug shut-off which is preferably built into the swivel unit within reach of the operator at the nozzle, thus permitting instant shut-off under pump pressure whenever desired.

Another important feature is the provision of a stream straightener which does not obstruct stream flow and therefore eliminates need for regulation or adjustment of the stand pipe during operation.

A further feature is the provision of a lock bar which is attached to the nozzle and may be locked in a selected position to maintain the nozzle at a desired inclination to the stand-pipe, the construction being designed to prevent interference with the angle of swing of the nozzle.

With these and other advantages in view, the invention consists of certain novel features of construction more fully described in the specification following, in conjunction with the accompanying drawing and particularly pointed out in the appended claims.

In the accompanying drawing:

Fig. 1 is a top plan view of the turret pipe with the swivel arms in extended position;

Fig. 2 is a side elevation thereof partly broken away;

Fig. 3 is a section partly broken away through the play-pipe and the control valve;

Fig. 4 is an enlarged section of the valve and its seats;

Figs. 5 and 6 are sections on the lines 5—5 and 6—6 of Figure 4; and

Fig. 7 is a perspective view of the lock swivel.

Referring to the drawing, 10 designates the body of the turret stand-pipe having a plurality of inlets 11, 12, and 13, to which the usual hose connections may be attached. Connected to the body 10 by a swivel joint 14 is a swivel section 15 of customary Y construction, the two arms 16 and 17 having inturned ends between which the base section 18 of the play-pipe or nozzle 19 is swingingly mounted. The arms 16 and 17 and the body 10 are equipped with spurs 20 forming a firm three-point support for the turret pipe.

Referring to Figure 3, the base section 18 is enlarged and bored to receive a rotary plug valve 21 seated on a machined bottom section 22, the upper section of the bore being screw-threaded to receive a closing plug 23.

The base section 18 has two inlet passages 24 and 25 respectively communicating with the arms 16 and 17 and separated by central web or diaphragm 26 adjoined with a corresponding web or diaphragm 27 at the forward end 28 of the base, which separates said forward end into passages 29 and 30 for the purpose hereinafter described.

The plug valve 21 has an operating stem 31 which extends through a bore in the bottom section 22, having an operating handle 32 secured thereto by a pin or other means, a washer 33 and a nut 34, screw-threadedly mounted on the stem 31, seating the valve 21 in operating position against the inner surface of the bottom section 22.

The valve has two inlet ports 35 and 36, two outlet ports 37 and 38, and a central web or diaphragm 39, aligned with webs 26 and 27, thus preventing admixture of the two streams oppositely entering from the opposed arms 16 and 17 to straighten out and prevent breaking up of the two opposing entering columns and obtain a more solid stream of water discharging from the nozzle, causing it to be projected a greater distance to increase the affective action of the stream.

The end 28 of base section 18 is screw-threaded to receive the correspondingly screw-threaded end of the play-pipe or nozzle 19, and has the usual inner pipe 40 joined to the outer pipe by the usual longitudinal flanges. While the base section is shown as an integral section comprising the portion with the two arms 16, 17 and the portion containing the valve 21, it may, if desired, be made in two separate portions which are rigidly secured together.

The improved turret pipe receives a plurality of streams through inlets 11, 12, and 13, the streams separating to enter arms 16 and 17, and respectively passing above and below the aligned webs 26, 39, and 27, which thus form a composite stream straightener. The nozzle therefore discharges a smooth, solid, long distance stream.

Since it may be desirable at times to leave the stand-pipe without attention, a lock device is provided to hold the nozzle at a selected inclination with respect to the stand-pipe.

The swivel section 15 is therefore provided with two spaced bearing ears 41 at a point adjacent the center, these ears mounting a pivot pin 42 on which a lock swivel 43 is pivotally mounted. The lock swivel 43, as shown in Figure 7, has an opening 44 through which the pivot pin 42 extends, an opening 45 through which a lock bar 46 extends, and a vertical opening 47 threaded to receive a wing bolt 48 which is manually rotatable to engage the lock bar 46 and lock it in place.

The lock bar 46 is curved at one end, this end being pivotally mounted on a pivot pin 49 which in turn is mounted in two spaced bearing ears 50 provided on the base section 18 at the rear portion thereof. The ears 43 and 50 are preferably integral with the swivel section and the base section, but may be secured thereto, as by welding or the like, if desired.

As the nozzle 19 is moved, the lock bar 46 slides in the lock swivel, which turns to prevent binding. The curved portion of the lock bar permits a very free swing of the nozzle, this swing being limited only by contact with the wing bolt 48 on the upper side.

The foregoing description is directed solely towards the construction illustrated, but I desire it to be understood that I reserve the privilege of resorting to all mechanical changes to which the device is susceptible, the invention being defined and limited only by the terms of the appended claims.

I claim:

1. In a turret pipe, a head section, a swivel section communicating therewith comprising two inwardly extending arms, a base section swivelled to said arms, a valve in said base section, and a nozzle communicating with said base section.

2. In a turret pipe, a head section, a swivel section communicating therewith comprising two inwardly extending arms, a base section swivelled to said arms, a rotary valve in said base section, and a nozzle communicating with said base section.

3. In a turret pipe, a head section, a swivel section communicating therewith comprising two inwardly extending arms, a nozzle unit swivelled to said arms, a flow control in said nozzle unit, and stream straightening means in said nozzle unit.

4. In a turret pipe, a head section, a swivel section communicating therewith comprising two inwardly extending arms, a base section swivelled to said arms, flow control means in said base section, stream straightening means in said base section, and a nozzle communicating with said base section.

5. In a turret pipe, a head section, a swivel section communicating therewith comprising two inwardly extending arms, a base section swivelled to said arms, a valve in said base section, aligned stream straightening means in said base section and valve, and a nozzle communicating with said base section.

6. In a turret pipe, a head section, a swivel section communicating therewith comprising two inwardly extending arms, a base section swivelled to said arms, flow control means in said base section, means in said base section maintaining the streams from said arms separate, and a nozzle communicating with said base section.

7. In a turret pipe, a head section, a swivel section communicating therewith comprising two inwardly extending arms, a base section swivelled to said arms, a valve in said base section, cooperating diaphragm means in said base section and said valve maintaining the streams from said arms separate, and a nozzle communicating with said base section.

8. A turret stand-pipe unit comprising a Y-shaped head section, a base section having opposite inlet openings and pivoted between the arms of said Y section, an axially rotatable flow control valve in said base section, a flow guiding web in said base section intermediate its opposite inlet openings and a cooperating flow guiding web in said valve arranged to register with that in said base section.

9. A turret stand-pipe unit comprising a head section having Y-shaped arms, a base section having opposite inlet ends and pivoted between the arms of the head, a flow control valve having its axis of rotation disposed at right angles to the liquid flow, a flow guide web in said base section on either side of said valve and a corresponding web in said valve arranged to register with those in said base section.

In testimony whereof I affix my signature.

JOHN T. CORLEY.